United States Patent
Cohn et al.

(10) Patent No.: US 11,624,328 B2
(45) Date of Patent: *Apr. 11, 2023

(54) PORT INJECTION SYSTEM FOR REDUCTION OF PARTICULATES FROM TURBOCHARGED DIRECT INJECTION GASOLINE ENGINES

(71) Applicant: Ethanol Boosting Systems, LLC, Cambridge, MA (US)

(72) Inventors: Daniel R. Cohn, Bridgton, ME (US); Leslie Bromberg, Sharon, MA (US)

(73) Assignee: Ethanol Boosting Systems, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,266

(22) Filed: May 24, 2022

(65) Prior Publication Data
US 2022/0282675 A1    Sep. 8, 2022

Related U.S. Application Data

(63) Continuation of application No. 17/706,825, filed on Mar. 29, 2022, now Pat. No. 11,371,449, which is a
(Continued)

(51) Int. Cl.
*F02D 41/38* (2006.01)
*F02D 37/02* (2006.01)
(Continued)

(52) U.S. Cl.
CPC ......... *F02D 37/02* (2013.01); *F02D 41/0007* (2013.01); *F02D 41/0025* (2013.01);
(Continued)

(58) Field of Classification Search
CPC .. F02D 37/02; F02D 41/0007; F02D 41/0025; F02D 41/064; F02D 41/3094;
(Continued)

(56) References Cited

U.S. PATENT DOCUMENTS 5,927,238 A    7/1999    Watson
5,960,755 A    10/1999   Diggs et al.
(Continued)

FOREIGN PATENT DOCUMENTS

CN    101228342 A    7/2008
CN    102345532 A    2/2012
(Continued)

OTHER PUBLICATIONS

International Search Report and Written Opinion dated Apr. 16, 2014 in corresponding PCT application No. PCT/US2013/073334.
(Continued)

*Primary Examiner* — Hai H Huynh
(74) *Attorney, Agent, or Firm* — Nields, Lemack & Frame, LLC

(57) ABSTRACT

The present invention describes a fuel-management system for minimizing particulate emissions in turbocharged direct injection gasoline engines. The system optimizes the use of port fuel injection (PFI) in combination with direct injection (DI), particularly in cold start and other transient conditions. In the present invention, the use of these control systems together with other control systems for increasing the effectiveness of port fuel injector use and for reducing particulate emissions from turbocharged direct injection engines is described. Particular attention is given to reducing particulate emissions that occur during cold start and transient conditions since a substantial fraction of the particulate emissions during a drive cycle occur at these times. Further optimization of the fuel management system for these conditions is important for reducing drive cycle emissions.

34 Claims, 3 Drawing Sheets

Related U.S. Application Data continuation of application No. 17/394,712, filed on Aug. 5, 2021, now Pat. No. 11,371,448, which is a continuation of application No. 17/340,326, filed on Jun. 7, 2021, now Pat. No. 11,125,171, which is a continuation of application No. 16/988,917, filed on Aug. 10, 2020, now Pat. No. 11,053,869, which is a continuation of application No. 16/774,620, filed on Jan. 28, 2020, now Pat. No. 10,774,759, which is a continuation of application No. 15/959,341, filed on Apr. 23, 2018, now Pat. No. 10,683,816, which is a continuation of application No. 15/214,533, filed on Jul. 20, 2016, now Pat. No. 9,976,496, which is a continuation of application No. 14/391,906, filed as application No. PCT/US2013/073334 on Dec. 5, 2013, now Pat. No. 9,435,288.

(60) Provisional application No. 61/734,438, filed on Dec. 7, 2012.

(51) Int. Cl.
| | |
|---|---|
| *F02D 41/06* | (2006.01) |
| *F02P 5/152* | (2006.01) |
| *F02D 41/00* | (2006.01) |
| *F02D 41/30* | (2006.01) |
| *F02D 41/34* | (2006.01) |
| *F02P 5/145* | (2006.01) |
| *F02M 69/04* | (2006.01) |
| *F02D 19/08* | (2006.01) |
| *F02D 13/02* | (2006.01) |
| *F02D 13/06* | (2006.01) |
| *F02B 75/12* | (2006.01) |
| *F02D 41/04* | (2006.01) |
| *F02D 41/10* | (2006.01) |
| *F02D 41/14* | (2006.01) |

(52) U.S. Cl.
CPC ....... *F02D 41/064* (2013.01); *F02D 41/3094* (2013.01); *F02D 41/345* (2013.01); *F02D 41/3836* (2013.01); *F02P 5/145* (2013.01); *F02P 5/1521* (2013.01); *F02B 2075/125* (2013.01); *F02D 13/0215* (2013.01); *F02D 13/06* (2013.01); *F02D 19/084* (2013.01); *F02D 41/0027* (2013.01); *F02D 41/047* (2013.01); *F02D 41/10* (2013.01); *F02D 41/1466* (2013.01); *F02D 2041/001* (2013.01); *F02D 2041/389* (2013.01); *F02D 2250/38* (2013.01); *F02M 69/046* (2013.01); *Y02T 10/10* (2013.01); *Y02T 10/12* (2013.01); *Y02T 10/30* (2013.01); *Y02T 10/40* (2013.01)

(58) Field of Classification Search
CPC ............... F02D 41/345; F02D 41/3836; F02D 41/0027; F02D 41/047; F02D 41/10; F02D 41/1466; F02D 2041/001; F02D 2041/389; F02D 2250/38; F02D 13/0215; F02D 13/06; F02D 19/084; F02P 5/145; F02P 5/1521; F02B 2075/125; F02M 69/046; Y02T 10/10; Y02T 10/12; Y02T 10/30; Y02T 10/40
USPC ......... 123/299, 300, 305, 672, 179.3, 179.4, 123/481, 339.1, 685; 701/103–105, 701/112–113
See application file for complete search history.

(56) References Cited

U.S. PATENT DOCUMENTS

| | | |
|---|---|---|
| 6,305,169 B1 | 10/2001 | Mallof |
| 6,453,664 B2 | 9/2002 | Ishii et al. |
| 6,637,386 B2 | 10/2003 | Murata et al. |
| 6,805,095 B2 | 10/2004 | Sun et al. |
| 7,089,908 B2 | 8/2006 | Fujieda et al. |
| 7,225,787 B2 | 6/2007 | Bromberg et al. |
| 7,303,144 B2 | 12/2007 | Alyanak |
| 7,370,610 B2 | 5/2008 | Ashford et al. |
| 7,444,987 B2 | 11/2008 | Cohn et al. |
| 7,546,834 B1 | 6/2009 | Ulrey et al. |
| 7,640,914 B2 | 1/2010 | Lewis et al. |
| 7,640,915 B2 | 1/2010 | Cohn et al. |
| 7,647,916 B2 | 1/2010 | Leone et al. |
| 7,690,341 B2 | 4/2010 | Abe et al. |
| 7,720,592 B2 | 5/2010 | Leone et al. |
| 7,726,289 B2 | 6/2010 | Murase et al. |
| 7,740,004 B2 | 6/2010 | Cohn et al. |
| 7,762,233 B2 | 7/2010 | Cohn et al. |
| 7,765,053 B2 | 7/2010 | Gwidt et al. |
| 7,770,560 B2 | 8/2010 | Ulrey et al. |
| 7,841,316 B2 | 11/2010 | Inoue |
| 7,841,325 B2 | 11/2010 | Cohn et al. |
| 7,890,241 B2 | 2/2011 | Russell |
| 7,933,713 B2 | 4/2011 | Leone |
| 7,957,888 B2 | 6/2011 | Leone et al. |
| 7,971,572 B2 | 7/2011 | Cohn et al. |
| 8,037,850 B2 | 10/2011 | Pursifull |
| 8,069,839 B2 | 12/2011 | Cohn et al. |
| 8,099,949 B2 | 1/2012 | Leone et al. |
| 8,100,107 B2 | 1/2012 | Bidner et al. |
| 8,146,568 B2 | 4/2012 | Cohn et al. |
| 8,165,780 B2 | 4/2012 | Russell |
| 8,171,915 B2 | 5/2012 | Cohn et al. |
| 8,206,470 B1 | 6/2012 | Jacobson |
| 8,267,074 B2 | 9/2012 | Leone et al. |
| 8,275,538 B2 | 9/2012 | Sumilla et al. |
| 8,276,565 B2 | 10/2012 | Cohn et al. |
| 8,302,580 B2 | 11/2012 | Cohn et al. |
| 8,316,809 B1 | 11/2012 | Patterson et al. |
| 8,353,269 B2 | 1/2013 | Kasseris et al. |
| 8,397,701 B2 | 3/2013 | Lewis et al. |
| 8,417,436 B2 | 4/2013 | Russell |
| 8,459,007 B2 | 6/2013 | Maier et al. |
| 8,468,983 B2 | 6/2013 | Cohn et al. |
| 8,522,746 B2 | 9/2013 | Cohn et al. |
| 8,578,913 B2 | 11/2013 | Yoshioka et al. |
| 8,707,913 B2 | 4/2014 | Cohn et al. |
| 8,733,321 B2 | 5/2014 | Cohn et al. |
| 8,763,367 B2 | 7/2014 | Leone et al. |
| 8,857,410 B2 | 10/2014 | Cohn et al. |
| 8,875,680 B2 | 11/2014 | Yoshioka |
| 8,944,026 B2 | 2/2015 | Tobergte et al. |
| 9,255,519 B2 | 2/2016 | Cohn et al. |
| 9,297,329 B2 | 3/2016 | Sumilla et al. |
| 9,382,857 B2 | 7/2016 | Glugla et al. |
| 9,435,288 B2 | 9/2016 | Cohn et al. |
| 9,441,570 B2 | 9/2016 | Cohn et al. |
| 9,512,798 B2 | 12/2016 | Zeng et al. |
| 9,556,784 B2 | 1/2017 | Leone |
| 9,631,573 B2 | 4/2017 | Sumilla et al. |
| 9,695,784 B2 | 7/2017 | Cohn et al. |
| 9,708,965 B2 | 7/2017 | Bromberg et al. |
| 9,739,213 B2 | 8/2017 | Kemmerling et al. |
| 9,810,166 B2 | 11/2017 | Cohn et al. |
| 9,840,980 B2 | 12/2017 | Cohn et al. |
| 9,874,168 B2 | 1/2018 | Thomas et al. |
| 9,945,297 B2 | 4/2018 | Tsuyuki et al. |
| 9,976,496 B2 | 5/2018 | Cohn et al. |
| 10,138,826 B2 | 11/2018 | Cohn et al. |
| 10,221,783 B2 | 3/2019 | Bromberg et al. |
| 10,227,945 B2 | 3/2019 | Bromberg et al. |
| 10,288,005 B2 | 5/2019 | Cohn et al. |
| 10,344,689 B2 | 7/2019 | Cohn et al. |
| 10,683,816 B2 | 6/2020 | Cohn et al. |
| 10,774,759 B2 | 9/2020 | Cohn et al. |

(56) References Cited

U.S. PATENT DOCUMENTS

| | | |
|---|---|---|
| 11,053,869 B2 | 7/2021 | Cohn et al. |
| 11,125,171 B1 | 9/2021 | Cohn et al. |
| 11,371,448 B2 | 6/2022 | Cohn et al. |
| 11,371,449 B1 | 6/2022 | Cohn et al. |
| 2001/0003280 A1 | 6/2001 | Yang |
| 2004/0154583 A1 | 8/2004 | Maemura |
| 2004/0163379 A1 | 8/2004 | Pott et al. |
| 2005/0166891 A1 | 8/2005 | Fukasawa |
| 2006/0180121 A1 | 8/2006 | Wickman et al. |
| 2007/0012295 A1 | 1/2007 | Maemura et al. |
| 2007/0023012 A1 | 2/2007 | Maemura et al. |
| 2007/0068485 A1 | 3/2007 | Hilditch |
| 2007/0089697 A1 | 4/2007 | Hara et al. |
| 2008/0022958 A1 | 1/2008 | I et al. |
| 2009/0088945 A1 | 4/2009 | Yi et al. |
| 2009/0282810 A1 | 11/2009 | Leone et al. |
| 2009/0299607 A1 | 12/2009 | Bauer |
| 2010/0049420 A1 | 2/2010 | Smith et al. |
| 2010/0251996 A1 | 10/2010 | Akimoto |
| 2011/0023467 A1 | 2/2011 | Kong et al. |
| 2011/0162620 A1 | 7/2011 | Bidner et al. |
| 2011/0203258 A1 | 8/2011 | Makartchouk et al. |
| 2011/0265758 A1 | 11/2011 | Glugla et al. |
| 2011/0301827 A1 | 12/2011 | Toyohara et al. |
| 2011/0320108 A1 | 12/2011 | Morinaga et al. |
| 2012/0024262 A1 | 2/2012 | Leone |
| 2012/0102925 A1 | 5/2012 | Leone et al. |
| 2012/0107203 A1 | 5/2012 | Arnold et al. |
| 2014/0100760 A1 | 4/2014 | Yi et al. |
| 2014/0172275 A1 | 6/2014 | Sumilla et al. |
| 2014/0297162 A1 | 10/2014 | Sumilla et al. |
| 2014/0331653 A1 | 11/2014 | Irisawa |
| 2015/0046068 A1 | 2/2015 | Hosaka et al. |
| 2015/0167576 A1 | 6/2015 | Glugla et al. |
| 2015/0240737 A1 | 8/2015 | Sumilla et al. |
| 2015/0285179 A1 | 10/2015 | Cohn et al. |
| 2015/0337744 A1 | 11/2015 | Matsuda et al. |
| 2015/0369162 A1 | 12/2015 | Cohn et al. |
| 2015/0377175 A1 | 12/2015 | Mano et al. |
| 2016/0115876 A1 | 4/2016 | Hoshi |
| 2016/0115884 A1 | 4/2016 | VanDerWege et al. |
| 2016/0237943 A1 | 8/2016 | Zhang |
| 2016/0319764 A1 | 11/2016 | Cohn et al. |
| 2016/0326971 A1 | 11/2016 | Cohn et al. |
| 2016/0356228 A1 | 12/2016 | Liu et al. |
| 2017/0145944 A1 | 5/2017 | Moreno |
| 2017/0145946 A1 | 5/2017 | Korenaga |
| 2017/0211501 A1 | 7/2017 | Tachibana et al. |
| 2017/0234257 A1 | 8/2017 | Sellnau et al. |
| 2017/0363035 A1 | 12/2017 | Cohn et al. |
| 2018/0016996 A1 | 1/2018 | Bernhard et al. |
| 2018/0023500 A1 | 1/2018 | Hollar et al. |
| 2018/0058364 A1 | 3/2018 | Kassai et al. |
| 2018/0066598 A1 | 3/2018 | Dusa et al. |
| 2018/0128145 A1 | 5/2018 | Uhrich et al. |
| 2018/0230928 A1 | 8/2018 | Kitazume et al. |
| 2018/0238245 A1 | 8/2018 | Cohn et al. |
| 2018/0306106 A1 | 10/2018 | Glugla |
| 2018/0328307 A1 | 11/2018 | Kurtz et al. |
| 2019/0136790 A1 | 5/2019 | Bromberg et al. |
| 2019/0145341 A1 | 5/2019 | Cohn et al. |
| 2019/0153968 A1 | 5/2019 | Bromberg et al. |
| 2019/0309697 A1 | 10/2019 | Cohn et al. |
| 2020/0003135 A1 | 1/2020 | Nagasaki et al. |
| 2020/0158035 A1 | 5/2020 | Cohn et al. |
| 2021/0293191 A1 | 9/2021 | Cohn et al. |
| 2021/0363927 A1 | 11/2021 | Cohn et al. |

FOREIGN PATENT DOCUMENTS

| | | |
|---|---|---|
| CN | 102400802 A | 4/2012 |
| CN | 104968913 A | 10/2015 |
| DE | 102015201191 A1 | 7/2016 |
| JP | 2006-250058 A | 9/2006 |
| JP | 2009-299538 A | 12/2009 |
| JP | 2010-255507 A | 11/2010 |
| WO | 2012/021990 A1 | 2/2012 |
| WO | 2013/080371 A1 | 6/2013 |
| WO | 2014/089304 A1 | 6/2014 |

OTHER PUBLICATIONS

International Search Report and Written Opinion dated Dec. 4, 2015 in co-pending PCT application No. PCT/US2015/047857.

International Search Report and Written Opinion dated Dec. 11, 2017 in co-pending PCT application No. PCT/US2017/053179.

Chinese communication, with English translation, dated Feb. 4, 2017 in corresponding Chinese patent application No. 201380072556.5.

Chinese communication, with English translation, dated Sep. 30, 2018 in co-pending Chinese patent application No. 201580059544.8.

European communication dated Apr. 9, 2018 in co-pending European patent application No. 15838005.5.

European communication dated Sep. 12, 2019 in co-pending European patent application No. 15838005.5.

Heiduk et al., "The New 1.8L TFSI Engine from Audi Part 2: Mixture Formation, Combustion Method and Turbocharging", Industry Gasoline Engines, vol. 72, pp. 58-64, 2011.

Office action dated Nov. 20, 2019 in co-pending U.S. Appl. No. 16/242,185.

Office action dated Jan. 9, 2020 in co-pending U.S. Appl. No. 16/241,161.

PORT INJECTION SYSTEM FOR REDUCTION OF PARTICULATES FROM TURBOCHARGED DIRECT INJECTION GASOLINE ENGINES

This application is a Continuation of U.S. patent application Ser. No. 17/706,825 filed Mar. 29, 2022, which is a Continuation of U.S. patent application Ser. No. 17/394,712 filed Aug. 5, 2021, which is a Continuation of U.S. patent application Ser. No. 17/340,326 filed Jun. 7, 2021 (now U.S. Pat. No. 11,125,171 issued Sep. 21, 2021), which is a Continuation of U.S. patent application Ser. No. 16/988,917 filed on Aug. 10, 2020 (now U.S. Pat. No. 11,053,869 issued Jul. 6, 2021), which is a Continuation of U.S. patent application Ser. No. 16/774,620 filed Jan. 28, 2020 (now U.S. Pat. No. 10,774,759 issued Sep. 15, 2020), which is a Continuation of U.S. patent application Ser. No. 15/959,341 filed Apr. 23, 2018 (now U.S. Pat. No. 10,683,816 issued Jun. 16, 2020), which is a Continuation of U.S. patent application Ser. No. 15/214,533 filed Jul. 20, 2016 (now U.S. Pat. No. 9,976,496 issued May 22, 2018), which is a Continuation of U.S. patent application Ser. No. 14/391,906 filed Oct. 10, 2014 (now U.S. Pat. No. 9,435,288 issued Sep. 6, 2016), which is a 371 of International Application No. PCT/US2013/073334 filed Dec. 5, 2013, which claims priority of U.S. Provisional Patent Application Ser. No. 61/734,438, filed Dec. 7, 2012, the disclosures of which are incorporated herein by reference in their entireties.

BACKGROUND

Particulate matter (PM) emissions from turbocharged direct injection spark ignition engines using gasoline and gasoline-ethanol blends are an increasing concern. A key factor that produces this problem is poor mixing from directly injected fuel (fuel that is directly introduced into the engine cylinder as liquid). The particulate emissions problem is increased in turbocharged engines due to increase in the absolute pressure in the cylinder. The concern about particulate emissions relates to both the total mass of the particulates and the number of particulates. Meeting anticipated European requirements for reducing the number of particulates appears to be especially demanding.

Port and direct injection have complimentary advantages. Due to better mixing, reduced wall wetting and improved evaporation of the fuel, both particulate mass/km and number of particulates/km emissions from port injection, where the fuel is introduced in a region outside the cylinders, are typically less than one tenth those from direct injection (when the fuel is introduced as a liquid into the cylinder). On the other hand, direct injection provides better knock resistance due to greater evaporative cooling of in cylinder charge and thus allows operation at higher levels of torque for a given engine displacement and/or compression ratio. Direct injection can also be used to provide better control of fueling and to further increase efficiency by use of stratified operation to enable lean operation at low loads.

SUMMARY

The present invention describes a fuel-management system for minimizing particulate emissions. The system optimizes the use of port fuel injection (PFI) in combination with direct injection (DI), particularly in cold start and other transient conditions.

An important aspect of using the combination of port and direct injection to reduce particulate emissions is the employment of control systems, such as those described in U.S. Pat. No. 8,146,568, to minimize the fraction of the fuel that is directly injected into the engine while also preventing knock as the torque is increased. Both closed loop control with a knock detector and open loop control with a look up table can be employed. These control systems can provide better mixing throughout a drive cycle with essentially no compromise in engine efficiency and performance. The engine can be operated with port fuel injection alone, direct injection alone or a combination of port and direct injection. The fraction of fuel that is port fuel injected can be controlled to prevent knock as a function of both torque and engine speed since the engine speed also affects the onset of knock.

In the present invention, the use of these control systems together with other control systems for increasing the effectiveness of port fuel injector use and for reducing particulate emissions from turbocharged direct injection engines is described. Particular attention is given to reducing particulate emissions that occur during cold start and transient conditions since a substantial fraction of the particulate emissions during a drive cycle occur at these times. Further optimization of the fuel management system for these conditions is important for reducing drive cycle emissions.

DETAILED DESCRIPTION

As described above, the present invention uses an engine control system to monitor and regulate the operation of the engine to both maximize engine performance and efficiency, and to minimize particulate emission. The engine control system may affect the fraction of fuel that is introduced using PFI and DI, based on engine conditions, particulate emissions and other factors.

Closed loop control, open loop control or a combination of open and closed loop may be used to optimize particulate emissions reduction while providing the desired amount of knock control. Various embodiments of these control systems are shown in the accompanying figures.

Figure 1:
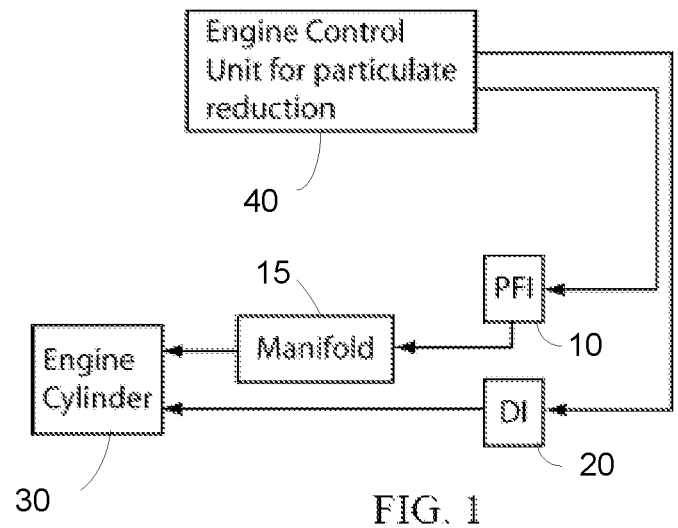
FIG. 1 illustrates an engine with two injectors; a port fuel injector that provides fuel to a region in the manifold, which is outside of the cylinder, one per cylinder, and a direct injector that introduces fuel directly into the cylinder, one per cylinder, with the ratio of fuel injected by each injector changed in an optimized way so as to reduce particulate emissions.

FIG. 1 shows a diagram of an engine system that has two sets of injectors, a port fuel injector 10 that introduces fuel into a region outside of the cylinder, such as manifold 15, one per cylinder, and a direct injector 20 that introduces fuel directly into the cylinder 30 as a liquid, one per cylinder. The engine may be a spark ignited engine, although other types of engine operation, such as HCCI (Homogeneous Charge Compression Ignition) or its variants (such as RCCI, Reaction Controlled Compression Ignition, or PCI, Premixed Compression Ignition, other low temperature combustion processes) may be employed. The engine control unit 40 uses information that relates to particulate emissions and adjusts the ratio of the amount of fuel that is port injected to the amount of fuel that is directly injected so as to reduce particulate emissions. In this embodiment, the engine control unit 40 does not have any feedback about engine performance. Thus, the information related to engine performance could be in the form of a look up table or a formula. The look up table or tables may use the engine map to estimate engine performance.

Figure 2:
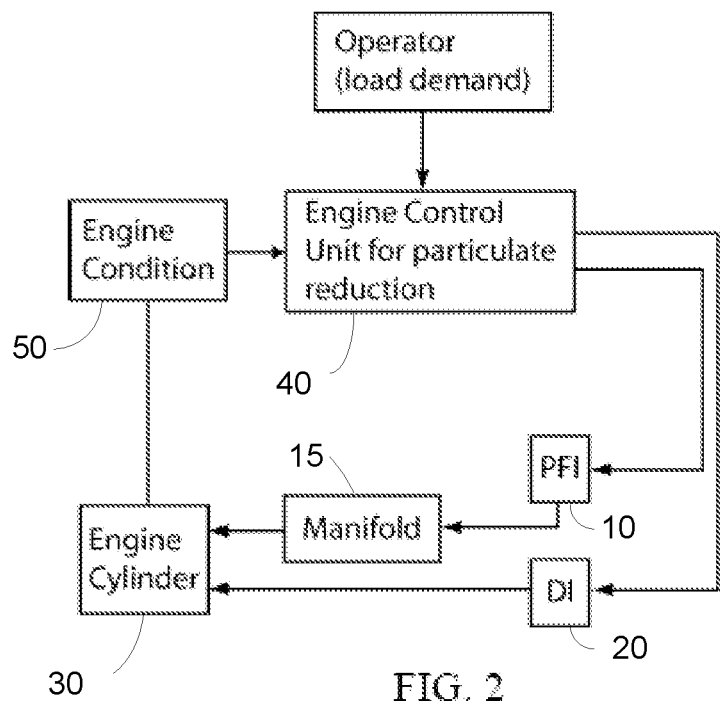
FIG. 2 is a schematic of an engine of FIG. 1, and shows an engine control system where information about the engine condition, such as temperature, that influences particulate formation and the load demand from the operator are used to determine the ratio of fuel injected through the port fuel and the direct injectors.

FIG. 2 shows a diagram of the engine control system of FIG. 1 during engine operation. The engine control unit 40, also referred to as the fuel management system, determines, in response to the load demand from the operator and using information about the engine condition 50 that influences particulate emissions, the proper operation of the injectors 10, 20. The engine condition 50 may include information about engine temperature, coolant temperature, time since start, status of the fuel pool in the manifold, and other factors that influence particulate emission.

Using these inputs, the engine control unit 40 may regulate the ratio of the fuel that is injected through the port fuel injector 10 as compared to that directly injected into the cylinder 30, and other injection characteristics. For example, the engine control unit 40 may also adjust the start of injection, the end of injection, the injection rate. In the case of the direct injector 20, injection rate may be adjusted through management of the fuel rail pressure, for example, or through control of the pulse width for a system that uses pulse-width modulation. The engine control unit 40 may also control the valve timing, allowing for the injection of port fuel injection through an open inlet valve, where the PFI fuel is introduced into the cylinder as liquid droplets, instead of as a gas vaporized by the hot valves. All of these various actions may be referred to as "injector operation".

Figure 3:
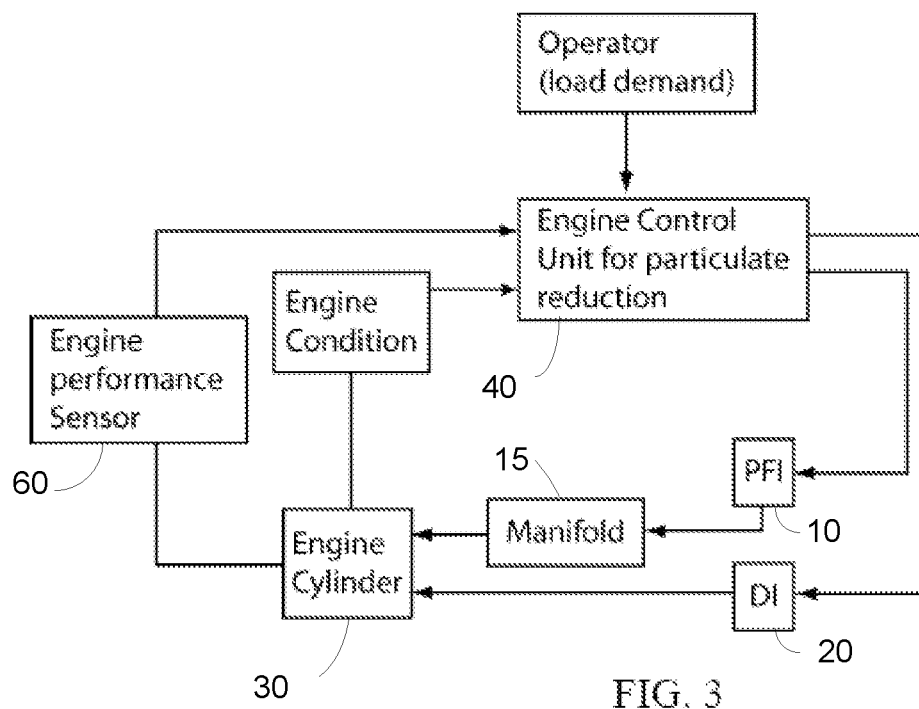
FIG. 3 illustrates an engine system with both port fuel and direct fuel injectors, as shown in FIG. 2, with additional engine performance sensors that measure the engine operation and/or emissions. This type of engine performance sensor could be a knock sensor, a misfire sensor, an exhaust sensor, or any combination of the three, where the exhaust sensor could monitor, in real time or near real time, the particulate emissions.

FIG. 3 shows the engine system of FIG. 2, with the addition of engine performance sensors 60 that measure the engine operation and/or emissions. An engine performance sensor 60 may be, for example, a knock sensor, a misfire sensor, an exhaust sensor, or any combination of the three. Information from the knock sensor can be used to reduce the relative amount of fuel that is port fuel injected as the torque is increased so as to prevent knock. In some embodiments, the exhaust sensor could monitor, in real time or near real time, the particulate emissions. The exhaust sensor may determine the number of particulates or the mass number of the particulates. The exhaust sensors could be electrostatic (measuring charge), optical (counting particles or extinction of an optical signal) or mass based (where the presence of the particulate mass changes a measurement, such as the resonant frequency of a system). This engine system may regulate the injection operation based on information from these engine performance sensors 60. Thus, while the embodiment of FIG. 2 uses a lookup table or equation to estimate engine performance, this embodiment may use information from the engine performance sensors 60.

Figure 4:
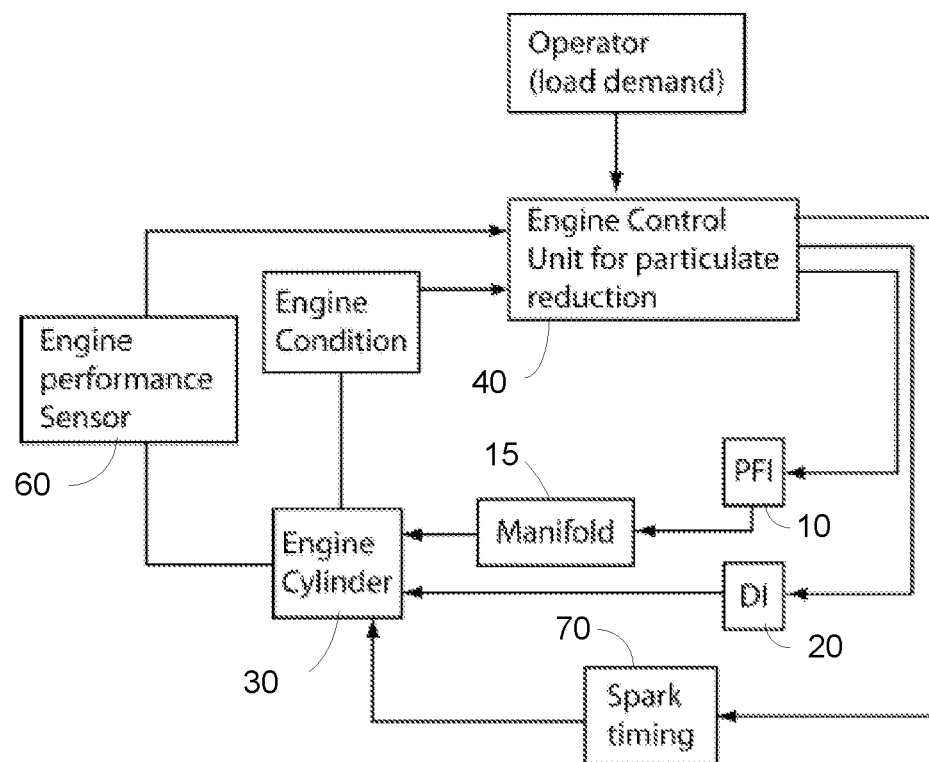
FIG. 4 shows the engine system of FIG. 3 with the introduction of spark timing so that spark retard may be adjusted to allow more PFI use when needed to reduce particulate emissions.

FIG. 4 shows a diagram of a control system, similar to FIG. 3, which controls the ratio of the amount of fuel that is port fuel injected to the amount of fuel that is directly injected. The engine control unit 40 may receive information on engine condition and engine performance. The engine control unit 40 also controls the amount of spark retard 70 that is used to enable a higher relative amount of fuel that is port injected. Using this information, at some times, such as in the cold start or warm restart periods, the ratio of the amounts of port injected fuel to directly injected fuel can be greater than would be used at other times in the drive cycle at the same value of engine torque and speed. Spark retard may be increased to prevent knock that would otherwise occur. The maximum ratio of port fuel injection to direct injection would be determined by the maximum amount of spark retard that could be used without an unacceptable reduction in engine efficiency and performance. Spark retard, with the resulting decrease in efficiency, can be used at these times to substantially reduce particulate emissions with only a minimal effect on engine efficiency during a drive cycle. Large spark retard during cold start or warm restart can have the additional advantage of rapid engine and catalyst heating (as the engine is less efficient). The amount of spark retard can be limited so that the engine efficiency and performance do not fall below selected values. The engine control unit 40 of FIG. 4 also controls injector operation, as described above.

Figure 5:
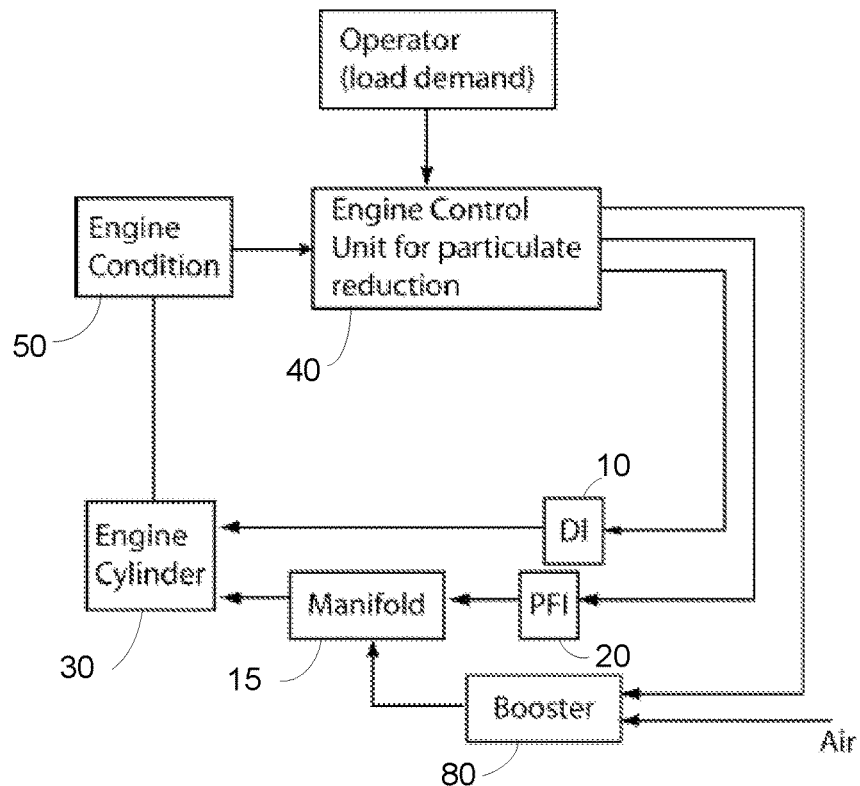
FIG. 5 illustrates an engine system with both port fuel injectors and direct injectors, as shown in FIG. 2, with an additional injector or set of injectors upstream from the compressor blades of the booster, which could be a turbocharger or a supercharger.

FIG. 5 shows the engine system shown in FIG. 2, with both port fuel injectors 10 and direct injectors 20. In this embodiment, an additional injector or set of injectors (not shown), referred to as upstream injectors, are disposed upstream from the compressor blades of the booster 80, which could be a turbocharger or a supercharger, are used. It may be advantageous to introduce the port fuel injected fuel upstream from the turbocharger 80. The high velocity of the blades induces strong turbulence in the air/fuel mixture and blasts the impinging liquid fuel, improving atomization of the fuel. One advantage of injection upstream from the turbocharger 80 is reduced number of injectors, as a single injector is needed. In order to improve air/fuel ratio, it may be possible to adjust the fuel that is introduced into every cylinder 30. It may be possible to combine a single injector upstream from the turbocharger or turbochargers 80 with additional port fuel injectors 10 that provide fuel to the inlet valves of the cylinders. Even under conditions when the blades of the compressor are not spinning very fast, there are enough surfaces for allowing evaporation of the fuel during transients that would allow for sufficient fuel vapors to enter the cylinder 30. The rest of the fuel will be deposited on the walls of the manifold 15 and will be evaporated later in the engine operation. Thus, the compressor in the booster 80 and the fuel injector operate as a carburetor, allowing for increased flexibility of control of the engine operation for controlling particulate emissions. The advantages of this configuration are rapid and effective evaporation of the fuel, allowing the fuel injected through the manifold to be in the vapor phase. In addition to smaller particular matter formation in cylinder, hydrocarbon emissions, especially during cold start and during transients, may also be decreased.

Thus, in this embodiment, the engine control unit 40 may control injector operation of the direct injectors 20, the port fuel injectors 10, and the additional upstream injectors.

Figure 6:
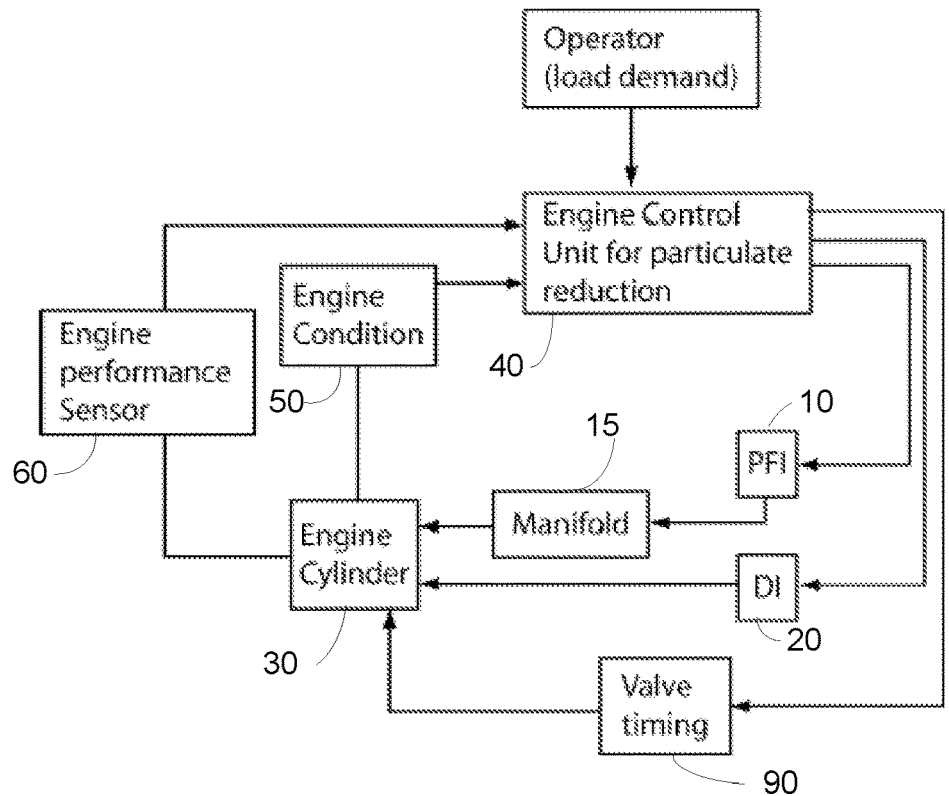
FIG. 6 shows the engine system of FIG. 3 with the introduction of valve timing (inlet, exhaust or both), which may be adjusted to allow more PFI use when needed to reduce particulate emissions.

FIG. 6 shows the engine system of FIG. 3 with port fuel injectors 10 and direct injectors 20 where variable valve timing 90 is used to allow a higher fraction of fuel provided by port fuel injection during conditions with increased particulate generation would occur. In this embodiment, the engine control unit 40 may employ variable valve timing to compensate for the reduced direct injected fuel. For example, at certain times, the use of direct injected fuel may cause excessive particulate emission. In these times, rather than using the requisite amount of direct injected fuel, variable valve timing 90 is used to insure no-knock operation. For instance, it may be possible to operate the engine with increased value of residuals for knock control, through appropriate choice of valve timing.

These figures show the sensors 50, 60 can be employed to monitor engine conditions and/or engine performance. One or more of these types of sensors can be used in an embodiment. Additionally, these figures show various compensation techniques that are used to allow the use of an amount of port injected fuel that would otherwise cause knock. These compensation techniques include, but are not limited to valve timing, injector timing, upstream injectors, and spark timing. Although each figure shows the use of only one of these compensation techniques, it is noted that more than one compensation technique may be used in a single embodiment. For example, spark timing and valve timing may both be employed in some configurations. Therefore, the figures should not be construed as limiting the disclosure to those particular configurations. Rather, these figures simply show various components that may be used.

Compensation Techniques

The above description discloses various compensation techniques, such as spark timing, and variable valve timing. However, other compensation techniques may also be used.

In addition to the use of variable valve timing, the use of on-demand cylinder deactivation can also be used in combination with two injectors. During transients at relatively low load, some of the cylinders can be deactivated. If the exhaust valves are not opened or only open partially or during a short time, during the following cycle, the high pressure, hot gases in the cylinder can be used to help vaporize the port fuel injected fuel in that same cylinder. When the inlet valve opens following the cycle with exhaust restricted, high pressure, heated air enters the manifold and helps vaporize the gasoline in the manifold and on the valves. The process can be repeated in the same cylinder, and the process can be arranged so that it occurs also, in a staggered manner, at other cylinders.

In the same manner, it would be possible to have a cycle with restricted inlet valve opening, with limited ingestion of port fuel, that goes through compression, power stroke and exhaust cycle without firing the spark and without opening inlet or exhaust valves. In the next intake valve opening, the air leaving the cylinder is hot and can vaporize the fuel in the valve or the manifold. If done in all cylinders, the engine actually fires only on about half the cycles. Alternatively, in the following cycle, direct injection can be used to inject into a hot cylinder charge, facilitating droplet evaporation and minimizing potential wall wetting and production of particulate matter.

Another compensation technique that may be used is as follows. It may be possible to adjust the pressure of the direct injected fuel, such as by adjusting the pressure in the common fuel rail. This serves to minimize the impingement on the combustion chamber walls (cylinder walls, piston and valves), especially at transient conditions or at cold start. If the pressure is difficult to manage, a strategy that can be used to avoid the injection of very high speed droplets that will wet the wall is to use PWM (Pulse Width Modulation) of the direct injector. Injectors have transients during turning on and turning off that can be used to modify the conditions of injection of the fuel, even at constant rail fuel pressure. Through short pulses allowed by PWM fuel control, it would be possible to inject short sprays of fuel that modify the jets interaction with the gas in the cylinder, for example, by preventing them from reaching the far wall. Although atomization may not be as good, the production of particulate matter could be reduced by the use of multiple pulses, and in particular, short pulses that are dominated by transient behavior of the injector. Because of the short duration of the times where PM is produced, the injectors can be prevented from overheating due to the large number of pulses required that heat the solenoid valve, the piezoelectric components or other components from the direct fuel injector.

Another compensation technique includes open-valve port fuel injection. The fueling system may use port fuel injection, when the intake valve is open, as an additional means for reducing particulates. Port fuel injection with the intake valve open enables some of the fuel to enter the cylinder in the liquid form and provide some vaporization cooling. This would provide knock suppression from charge cooling that could replace that which is typically provided by direct injection. Although less knock suppression by charge cooling is obtained for a given amount of fuel, the net result could be less particulate formation, especially during transients. The same port fuel injector could be used for both conventional port fueling injection with the intake valve closed and for open-valve port fuel injection where increased knock resistance could be provided.

Engine Control Unit Operation

In addition to information that is used to determine how much port fuel injection can be used without encountering knock, the fuel management system may also employ additional information and requirements to control the relative amounts of fuel that are port and directly injected. This may include information related to cold start, such as engine temperature, and information that determines when stratified injection would be used. Additional information for controlling of the ratio of directly injected fuel to port injected fuel could be provided by sensors that determine particulate mass and number, as described above.

The control system uses some or all of this information in conjunction with the requirement to avoid knock to determine the ratio of port fuel injection to direct injection that is used at a given value of torque and speed. The ratios may be different depending on whether the primary objective is reduction of engine particulate mass or engine particulate number. It would also be possible to trade-off particulate matter and hydrocarbon emissions. In addition to the combustion information, information on the nature of the fuel can be used to adjust the ratio of the direct injected and port injected fuels. If the fuel has substantial content of saturated hydrocarbons or oxygenates (alcohols), the ratio of direct injected to port fuel injected fuel can be adjusted to provide best emissions. The nature of the fuel can be determined by the past history of the vehicle. For example, when the fuel contains a substantial fraction of alcohols, direct injection of the fuel can be used to decrease simultaneously hydrocarbon emissions and particulate emissions, compared to the case with port fuel injection of the same fuel, which produces little particulate matter but substantial hydrocarbon vapor during cold start and warm restart.

In addition, as described above, closed loop control using measurements of particulate mass and number can be employed. The fuel management system can control the fraction of fuel that is introduced by port fuel injection so to minimize particulate mass or number or some combination of the two.

The parameters that are inputs to the control system can include engine temperature; time after ignition; rate of change of engine fueling; rate of change of engine speed; rate of change of torque, engine speed and engine torque; fuel composition. The control system could also take into account the use or non-use of stratified direct injection.

These various embodiments, such as shown in FIGS. 1-6, can be used to decrease particulate emission during various critical times. Some times where particulate emission is known to be excessive are engine cold start and engine shutdown. Thus, the engine control unit described herein can be used to adjust the engine operating conditions, such that when particulate emissions would be high, the control system will adjust the port fuel injection to directly injected fuel ratio so as to use a greater fraction of port injected fuel than would be used if particulate emissions were not a concern.

Cold Start

For example, when the engine is operated during cold start at a value of torque where a substantial amount of directly injected fuel would otherwise be needed to prevent knock, one or more compensation techniques may be introduced to reduce the relative amount of directly injected fuel without resulting in knock.

One such compensation technique is spark retard. Increased spark retard results in decreased efficiency. However, operation with reduced fuel efficiency during cold start and other transients, for most driving cycles, does not substantially affect the overall fuel efficiency. Moreover, the lower efficiency of engine operation during the short cold start transient can have the beneficial effect of increasing the rate of warm-up of engine and aftertreatment components.

During cold start, particulate control can be achieved through similar means used to minimize the production of hydrocarbons that would result in fast engine and catalyst warm-up. Thus, spark retard beyond what is required to control knock, valve timing adjustment to maximize pressure in the cylinder and residuals, and possible injection of a small fraction of the fuel through the direct injector can be used to minimize the formation of particulates during the cold start. Either the timing of the inlet valve, the exhaust valve or both can be adjusted by the operating system in order to minimize the production of particulates. The effect can be adjustment modification of the pressure, composition or flow dynamics in the cylinders. In the case of the flow dynamics, the flow can be modified from that during steady state conditions (either tumble or swirl or quiescent) so that the resulting flow during the transient minimizes wall wetting and production of particulates. In the case of multiple inlet valves or multiple exhaust valves, the timing of each valve may be adjusted independently in order to modify the flow in cylinder.

Another control feature for reducing particulate emissions during cold start is to reduce the amount of direct injection that is used in order to minimize hydrocarbon vapor emissions. The fueling of the engine at the earliest time in the cold start period could be by direct injection alone or mainly by direct injection and the relative amount of fueling by port fuel injection could increased as a function of time as the engine and catalyst warm up. Information on the fuel composition (mostly alcohol content) can be used to adjust the amount of directly injected fuel.

The increased role of port injection as a function of time would be determined by the tradeoff between the benefit of using direct injection for better fuel control through precise injection of the amount of the fuel that is needed for near stoichiometric combustion and the detriment of the greater larger inhomogeneity of the air fuel mixture. Port fuel injection results in improved mixture uniformity while at the same time less precise control of the fuel injection, as the fuel transport occurs through the film established near the inlet valve or valves. The relative amounts of port fuel and direct fuel injection would be optimized as a function of time after the fuel has been ignited so as to minimize particulate emissions. This optimization could be facilitated by allowing a greater relative amount of port fuel injection, when needed, by increasing spark retard.

The use of multiple points and forms of fuel introduction into the cylinder is useful during these times. For example, during cold start operation, the control system could call for direct injection for a few cycles during the startup, for precise metering of the fuel, followed by increased use of port fuel that could reduce the particulate emissions. Multiple injections from the direct injectors could be used to minimize the production of particulates.

Engine Shutdown

Employment of an optimized combination of port fuel injection and direct injection during engine shutdown could also be employed. Operation for the few cycles after engine shutdown without use of port injection could reduce the film at the valves and reduces the amount of fuel in the puddle near the inlet valves for the subsequent start.

Other Transients

The control approach described above could also be applied to certain transient conditions during the rest of the drive cycle.

This strategy can also be used for transient operation in vehicles with directly injected spark ignition engines that use engine shutdown and restart for improved efficiency; this stop-start operation is used during vehicle deceleration and idle to improve efficiency by not using the engine when it operates very inefficiently. The strategy can also be used for vehicles with full hybrid powertrains.

In addition to use at cold start and engine shutdown, the optimized port fuel injection—direct injection system discussed above can be useful for operation with certain transients where there is rapid variation in engine speed or torque. This can be especially important at high engine speeds. At high engine speeds, there are issues with mixture formation because of the shortened times, although there is increased turbulence in the cylinders. Direct injection should be minimized because mixture formation issues resulting in particulate emissions. However, since operation at high speed usually is associated with increased temperatures, this need could be reduced by increased particulate matter oxidation occur under these conditions.

Other Techniques

While direct injection may be useful for controlling hydrocarbon vapor emissions during cold start and other transients, these emissions can be controlled with conventional means. In contrast, particulate emissions, if not sufficiently reduced by fuel management, could require use of a gasoline particulate filter (GPF), which can result in significant additional complexity and cost. Thus, it may be attractive for the control systems to change the relative amounts of port and direct injected fuel so as to reduce particulate emissions at the expense of more hydrocarbon emissions.

Progress in fueling system technology can make it possible to control the fuel injected in each cylinder. Thus, instead of commanding all the injectors to introduce the same amount of fuel, and same injector timing and other conditions, the fuel injection conditions for each cylinder could be controlled separately. It is known that there are variations of performance of different cylinders, and the computers can now control each cylinder separately. It may be possible, for example, to run some cylinders at different stoichiometries than others, with an overall correct stoichiometry of the air/fuel mixture. It may also be possible during transients, such as cold start or hard acceleration, to change temporarily the overall stoichiometry.

Another option is to use different fuels during cold startup and transients, if available on board. Fuels that can be easily evaporated (fuels that have high vapor pressure, such as alcohols, low heat of evaporation or fuels with low evaporation temperature, or fuels with mostly saturated carbon bonds) can be used to minimize particulate production. The fuel that can be easily evaporated or fuel that have low propensity for making soot (such as methanol or ethanol) can be used during these conditions to minimize particulate matter. Although methanol and ethanol have relatively high heat of vaporization, they have relatively low propensity for making soot, and they have high vapor pressure. The fuels that can be easily evaporated, or the fuel that has low propensity for making soot can be either provided through external means to a separate container (i.e., external fill) or can be separated on-board from a single fuel that is a mixture of gasoline and alcohol and stored in a separate container. Since only a small amount of fuel is required, the size of the tank and/or the capacity of the onboard separating system can be relatively small.

The ratio of the amount of fuel that is port fuel injected to the fuel that is directly injected can be varied according to the amount of alcohol (ethanol or methanol), if any, that is mixed in with the gasoline. The use of alcohol can reduce particulate mass and number and thus reduce the relative amount of port fuel injection that is needed to reduce particulate emissions. The relative amount of port fuel injection can be decreased when alcohol is mixed with gasoline or the relative amount of alcohol in a mixture with gasoline is increased.

The embodiments that have been described can also be utilized with a supercharged engine or with a direct injection engine that does not use pressure boosting. They can also be used with engines that are operated with a substantially stoichiometric fuel air ratio with or without EGR; and with engines operated with either rich or lean fuel air mixtures.

What is claimed is:

1. A spark ignition engine having port fuel injectors and direct fuel injectors;
   wherein the port fuel injectors and direct fuel injectors introduce a same fuel into the spark ignition engine;
   wherein the same fuel that is introduced into the spark ignition engine comprises gasoline;
   wherein at an earliest time in cold start, the spark ignition engine is fueled with direct fuel injection alone;
   wherein following the earliest time in cold start, port fuel injection is introduced;
   wherein stop-start engine operation is used during deceleration and idling to increase efficiency;
   wherein in stop-start operation, the spark ignition engine is fueled with direct fuel injection alone at an end of engine shutdown;
   wherein in stop-start operation, the spark ignition engine is fueled with direct fuel injection alone when it is restarted;
   wherein after the spark ignition engine is restarted with direct fuel injection alone, port fuel injection is introduced;
   wherein in a first part of a drive cycle, the spark ignition engine is fueled with port fuel injection alone;
   wherein in a second part of the drive cycle, the spark ignition engine is fueled with both port fuel injection and direct fuel injection; and
   wherein in certain portions of the second part of the drive cycle, the relative amount of fueling provided by port fuel injection is increased and spark timing is changed so as to become more retarded;
   wherein in certain other portions of the second part of the drive cycle, the relative amount of fueling provided by port injection decreases with increasing torque; and
   wherein the spark ignition engine is turbocharged and employed is a full hybrid powertrain.

2. The spark ignition engine of claim 1, wherein the change in the certain portions of the second part of the drive cycle of the relative amount of fueling provided by port fuel injection reduces particulate emissions.

3. The spark ignition engine of claim 1, wherein the relative amount of fueling provided by port fuel injection is controlled by using information about at least one of coolant temperature and engine temperature.

4. The spark ignition engine of claim 1, wherein during at least part of a drive cycle, the relative amount of fueling provided by port fuel injection is controlled using information about a time after ignition.

5. The spark ignition engine of claim 1, wherein in the certain portions, spark retard is increased so as to prevent knock when the relative amount of fueling provided by port fuel injection is increased.

6. The spark ignition engine of claim 1, wherein during at least part of cold start, particulate emissions are reduced and hydrocarbon emissions are increased by an increase in the relative amount of fueling that is provided by port fuel injection.

7. The spark ignition engine of claim 1, wherein use of the increase in the relative amount of fueling provided by port fuel injection which is accompanied by increasing spark retard in the certain portions in the second part of the drive cycle is controlled by use of information about engine torque.

8. The spark ignition engine of claim 1, wherein use of the increase in the relative amount of fueling provided by port fuel injection which is accompanied by increasing spark retard in the certain portions in the second part of the drive cycle is controlled by use of information about engine speed.

9. The spark ignition engine of claim 1, wherein use of the increase in the relative amount of fueling provided by port fuel injection which is accompanied by increasing spark retard in the certain portions in the second part of the drive cycle is controlled by use of information about engine torque and engine speed.

10. The spark ignition engine of claim 1, wherein a misfire detector is employed in the control of the relative amount of fueling provided by port fuel injection.

11. The spark ignition engine of claim 1, wherein during at least a part of cold start, the relative amount of fueling from port fuel injection is greater than it is during at least one other time in the drive cycle at the same value of engine torque and speed.

12. The spark ignition engine of claim 1, wherein during at least part of a drive cycle, the relative amount of fueling provided by port fuel injection increases as the spark ignition engine warms up.

13. The spark ignition engine of claim 1, wherein following the earliest time in cold start, the relative amount of fueling provided by port fuel injection is increased.

14. A spark ignition engine having port fuel injectors and direct fuel injectors;
wherein the port fuel injectors and direct fuel injectors introduce a same fuel into the spark ignition engine;
wherein the same fuel that is introduced into the spark ignition engine comprises gasoline;
wherein at an earliest time in cold start, the spark ignition engine is fueled using both direct fuel injection and port fuel injection;
wherein at the earliest time in cold start, more fuel is introduced by direct fuel injection than by port fuel injection;
wherein stop-start engine operation is used during deceleration and idling to increase efficiency;
wherein in stop-start operation, the spark ignition engine is fueled with direct fuel injection alone at the end of engine shutdown;
wherein in stop-start operation, the spark ignition engine is fueled with direct fuel injection alone when it is restarted;
wherein after the spark ignition engine is restarted with direct fuel injection alone, port fuel injection is introduced;
wherein in a first part of a drive cycle, the spark ignition engine is fueled with port fuel injection alone;
wherein in a second part of the drive cycle, the spark ignition engine is fueled with both port fuel injection and direct fuel injection; and
wherein in certain portions of the second part of the drive cycle, the relative amount of fuel provided by port fuel injection is increased and spark timing is changed so as to become more retarded;
wherein in certain other portions of the second part of the drive cycle, the relative amount of fueling provided by port injection decreases with increasing torque; and
wherein the spark ignition engine is turbocharged and is employed in a full hybrid powertrain.

15. The spark ignition engine of claim 14, wherein the change in the certain portions of the second part of the drive cycle of the relative amount of fueling provided by port fuel injection reduces particulate emissions.

16. The spark ignition engine of claim 14, wherein the relative amount of fueling provided by port fuel injection is controlled by using information about at least one of coolant temperature and engine temperature.

17. The spark ignition engine of claim 14, wherein during at least part of a drive cycle, the relative amount of fueling provided by port fuel injection is controlled using information about a time after ignition.

18. The spark ignition engine of claim 14, wherein in the certain portions, spark retard is increased so as to prevent knock when the relative amount of fueling provided by port fuel injection is increased.

19. The spark ignition engine of claim 14, wherein during at least part of cold start, particulate emissions are reduced and hydrocarbon emissions are increased by an increase in the relative amount of fueling that is provided by port fuel injection.

20. The spark ignition engine of claim 14, wherein use of the increase in the relative amount of fueling provided by port fuel injection which is accompanied by increasing spark retard in the certain portions in the second part of the drive cycle is controlled by use of information about engine torque.

21. The spark ignition engine of claim 14, wherein use of the increase in the relative amount of fueling provided by port fuel injection which is accompanied by increasing spark retard in the certain portions in the second part of the drive cycle is controlled by use of information about engine speed.

22. The spark ignition engine of claim 14, wherein use of the increase in the relative amount of fueling provided by port fuel injection which is accompanied by increasing spark retard in the certain portions in the second part of the drive cycle is controlled by use of information about engine torque and engine speed.

23. The spark ignition engine of claim 14, wherein a misfire detector is employed in the control of the relative amount of fueling provided by port fuel injection.

24. The spark ignition engine of claim 14, wherein during at least a part of cold start, the relative amount of fueling from port fuel injection is greater than it is during at least one other time in the drive cycle at the same value of engine torque and speed.

25. The spark ignition engine of claim 14, wherein following the earliest time in cold start, the relative amount of fueling provided by port fuel injection is increased.

26. The spark ignition engine of claim 14, wherein during at least part of a drive cycle, the relative amount of fueling provided by port fuel injection increases as the spark ignition engine warms up.

27. A spark ignition engine having port fuel injectors and direct fuel injectors;
wherein the port fuel injectors and direct fuel injectors introduce a same fuel into the spark ignition engine;
wherein the same fuel that is introduced into the spark ignition engine comprises gasoline;
wherein at an earliest time in cold start, the spark ignition engine is fueled with direct fuel injection alone;
wherein following the earliest time in cold start, port fuel injection is introduced;
wherein stop-start engine operation is used during deceleration and idling to increase efficiency;
wherein in stop-start operation, the spark ignition engine is fueled with direct fuel injection during at least part of engine shutdown;
wherein in stop-start operation, the spark ignition engine is fueled with direct fuel injection when it is restarted;
wherein in a first part of a drive cycle, the spark ignition engine is fueled with port fuel injection alone;
wherein in a second part of the drive cycle, the spark ignition engine is fueled with both port fuel injection and direct fuel injection, and
wherein during at least part of a drive cycle, the relative amount of fueling provided by port fuel injection increases as the spark ignition engine warms up.

28. The spark ignition engine of claim 27, wherein the spark ignition engine is fueled with direct fuel injection alone at the end of engine shutdown and is also fueled with direct fuel injection alone at engine restart.

29. The spark ignition engine of claim 27, wherein in certain portions of the second part of the drive cycle, the relative amount of fueling provided by port fuel injection is increased and is accompanied by increasing spark retard.

30. The spark ignition engine of claim 27, wherein the engine is a turbocharged and is used in full hybrid powertrain.

31. A spark ignition engine having port fuel injectors and direct fuel injectors;
   wherein the port fuel injectors and direct fuel injectors introduce a same fuel into the spark ignition engine;
   wherein the same fuel that is introduced into the spark ignition engine comprises gasoline;
   wherein at an earliest time in cold start, the spark ignition engine is fueled using both direct fuel injection and port fuel injection;
   wherein at the earliest time in cold start, more fuel is introduced by direct fuel injection than by port fuel injection;
   wherein stop-start engine operation is used during deceleration and idling to increase efficiency;
   wherein in stop-start operation, the spark ignition engine is fueled with direct fuel injection during at least part of engine shutdown;
   wherein in stop-start operation, the spark ignition engine is fueled with direct fuel injection when it is restarted;
   wherein in a first part of a drive cycle, the spark ignition engine is fueled with port fuel injection alone;
   wherein in a second part of the drive cycle, the spark ignition engine is fueled with both port fuel injection and direct fuel injection; and
   wherein during at least part of a drive cycle, the relative amount of fueling provided by port fuel injection increases as the spark ignition engine warms up.

32. The spark ignition engine of claim 31, wherein the spark ignition engine is fueled with direct fuel injection alone at the end of engine shutdown and is also fueled with direct fuel injection alone at engine restart.

33. The spark ignition engine of claim 31, wherein in certain portions of the second part of the drive cycle, the relative amount of fueling provided by port fuel injection is increased and is accompanied by increasing spark retard.

34. The spark ignition engine of claim 31, wherein the engine is a turbocharged and is used in full hybrid powertrain.

* * * * *